United States Patent
Coretto et al.

(10) Patent No.: US 10,371,267 B2
(45) Date of Patent: Aug. 6, 2019

(54) ROTARY ADJUSTABLE ORIFICE PLATE VALVE

(71) Applicant: Hamilton Sundstrand Corporation, Charlotte, NC (US)

(72) Inventors: August M. Coretto, Manchester, CT (US); Peter M. Ballard, Enfield, CT (US); Aaron F. Rickis, Feeding Hills, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 90 days.

(21) Appl. No.: 15/411,836

(22) Filed: Jan. 20, 2017

(65) Prior Publication Data
US 2018/0209547 A1    Jul. 26, 2018

(51) Int. Cl.
F16K 3/08 (2006.01)
F02C 7/232 (2006.01)
F16K 3/10 (2006.01)

(52) U.S. Cl.
CPC .............. *F16K 3/085* (2013.01); *F02C 7/232* (2013.01); *F16K 3/08* (2013.01); *F16K 3/10* (2013.01); *F05D 2250/36* (2013.01); *F05D 2250/411* (2013.01); *F05D 2250/90* (2013.01); *F05D 2260/406* (2013.01); *F05D 2260/85* (2013.01)

(58) Field of Classification Search
CPC ... F16K 3/085; F16K 3/08; F16K 3/10; F02C 7/232; F05D 2250/36; F05D 2250/411; F05D 2250/90; F05D 2250/226; F05D 2250/406; F05D 2260/85

USPC .................... 251/208, 209, 309, 310; 138/46
See application file for complete search history.

(56) References Cited

U.S. PATENT DOCUMENTS

| 1,271,359 | A | * | 7/1918 | Price | F16K 5/12 |
| | | | | | 137/625.12 |
| 4,058,289 | A | * | 11/1977 | Hicks | F16K 3/32 |
| | | | | | 137/606 |
| 4,617,957 | A | * | 10/1986 | Sandling | F16K 5/0271 |
| | | | | | 137/315.13 |
| 7,526,911 | B2 | | 5/2009 | Pickard et al. | |

(Continued)

FOREIGN PATENT DOCUMENTS

| CN | 105909814 A | 8/2016 |
| EP | 1903416 A2 | 3/2008 |

(Continued)

OTHER PUBLICATIONS

Extended European Search Report, of the European Patent Office, dated Jun. 20, 2018, issued in corresponding European Patent Application No. 18152644.3.

*Primary Examiner* — Kevin F Murphy
*Assistant Examiner* — Kelsey E Cary
(74) *Attorney, Agent, or Firm* — Locke Lord LLP; Scott D. Wofsky; Daniel J. Fiorello

(57) ABSTRACT

A valve with a rotationally adjustable flow area can include a first member defining a first wall having a first opening therein, and a second member defining a second wall having a second opening therein, the first member being rotatable relative to the second member, and flow area through the valve being defined by fluidic communication between the first opening and the second opening that varies with relative rotational position between the first member and the second member.

17 Claims, 6 Drawing Sheets

(56) References Cited

U.S. PATENT DOCUMENTS

| | | | | |
|---|---|---|---|---|
| 7,695,445 | B2 * | 4/2010 | Yuki | A61M 39/223 |
| | | | | 137/625 |
| 8,699,179 | B1 * | 4/2014 | Golgolab | G11B 25/043 |
| | | | | 251/310 |
| 2007/0180813 | A1 | 8/2007 | Pickard et al. | |
| 2007/0204924 | A1 * | 9/2007 | Delgiacco | F16K 3/085 |
| | | | | 137/625.31 |
| 2008/0156378 | A1 * | 7/2008 | Zhang | F16K 1/307 |
| | | | | 137/269 |
| 2010/0275702 | A1 | 11/2010 | Kinback et al. | |

FOREIGN PATENT DOCUMENTS

| | | | |
|---|---|---|---|
| EP | 2784360 | A2 | 10/2014 |
| EP | 3081784 | A1 | 10/2016 |
| GB | 1549789 | A | 8/1979 |

* cited by examiner

ROTARY ADJUSTABLE ORIFICE PLATE VALVE

BACKGROUND

1. Field

The present disclosure relates to fuel systems, more specifically to rotary adjustable orifice plate valves.

2. Description of Related Art

During pre-start engine conditions, fuel flow from a first path (referred to by pressure P1) into a second path (referred to by pressure P2) is required to move a Windmill Bypass Valve (WBV) off the stop surface into a regulating position, where it can set the pressure required to move actuators. In a traditional fuel control, pre-start flow into P2 is lap leakage from P1 through upstream valves (e.g., a metering valve (MV)), and it is possible for the WBV face seal to leak and vent the entirety of this flow to another path (e.g., referred to by pressure Pd) without setting a high enough P2 pressure.

A minimum flow is needed such that the WBV will be in a regulating position where it can set pressure for actuators. Leakage is insufficient to meet this minimum flow. To ensure sufficient minimum flow, it is required to add an orifice between P1 and P2 such that there will be constant flow. However static fixed orifices negatively impact accuracy analysis, and are high cost with necessary flow accuracy.

Such conventional methods and systems have generally been considered satisfactory for their intended purpose. However, there is still a need in the art for improved fuel systems. The present disclosure provides a solution for this need.

SUMMARY

A valve with a rotationally adjustable flow area can include a first member defining a first wall having a first opening therein, and a second member defining a second wall having a second opening therein, the first member being rotatable relative to the second member, and flow area through the valve being defined by fluidic communication between the first opening and the second opening that varies with relative rotational position between the first member and the second member.

In certain embodiments, the valve can be a rotary adjustable plate orifice valve that can include a housing including a first fluid path opening and a second fluid path opening, a sleeve disposed at least partially within the housing and having a sleeve opening defined by a cam surface, and a spool disposed at least partially within the sleeve and the housing and configured to rotate relative to the sleeve. The spool includes a plate face that abuts the cam surface and a plate orifice defined in the plate face and positioned to be partially in fluid communication with the opening and to be partially blocked by the cam surface. An amount of open area of the orifice that is in fluid communication with the sleeve opening changes as a function of a rotational position of the orifice relative to the cam surface. Fluid can flow between the first fluid path and the second fluid path through the plate orifice.

The sleeve can further include one or more radial openings for receiving pressure from the first fluid path at the sleeve opening. A filter can be disposed over the radial openings. The cam surface can define a spiral shape. Any other suitable shape is contemplated herein. The plate orifice can be circular in cross-sectional shape. Any other suitable shape is contemplated herein.

The spool can include a face seal in sealing communication with the housing. A ring seal can be disposed around an outer diameter of the sleeve and in sealing communication with the housing.

The spool can include a threaded end opposite the plate face. A lock nut can be in threaded connection with the threaded end of the spool. The lock nut can tighten the plate face of the spool against the cam surface of the sleeve.

The spool can include a ring seal disposed in sealing communication with an inner diameter of the sleeve. The valve can include a cap configured to connect to the sleeve at an opposite end relative to the cam surface to cover the threaded end of the spool and the lock nut disposed on the threaded end. In certain embodiments, flow from the first fluid path can be filtered flow according to filtration hierarchy for fuel control.

In accordance with at least one aspect of this disclosure, a method can include rotating a spool of a valve such that a plate orifice defined in a plate face thereof is positioned relative to a cam surface of a sleeve at a predetermined rotational position to block a predetermined amount of flow area of the plate orifice. In certain embodiments, the method can include locking the spool in place after position the spool and the plate orifice in the predetermined rotational position. Locking the spool includes tightening a lock nut threadably engaged with a threaded end of the spool against an inner surface of the sleeve to compress the plate face of the spool against the cam surface.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
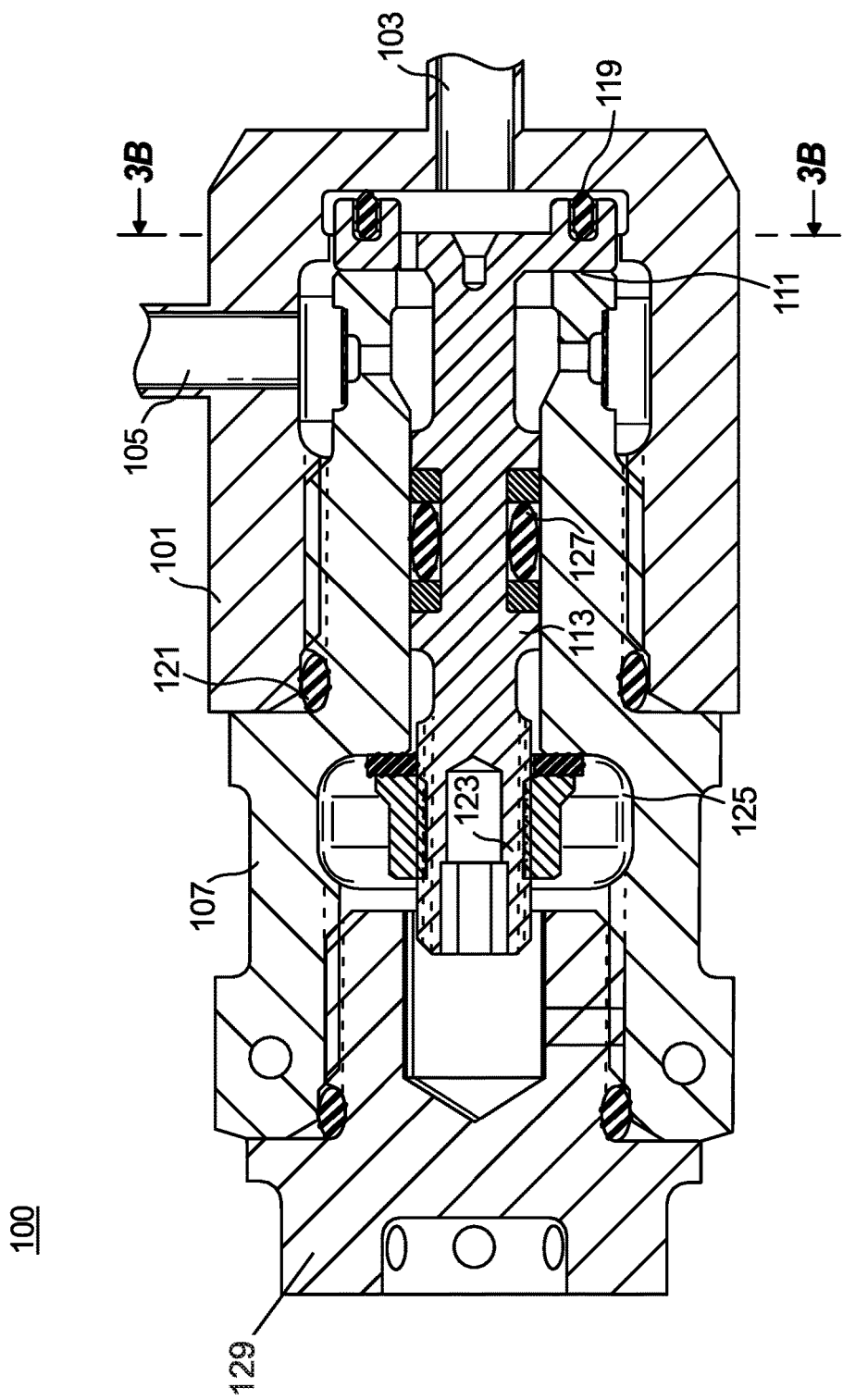
FIG. 1 is a cross-sectional view of an embodiment of a rotary adjustable plate orifice valve in accordance with this disclosure.

Reference will now be made to the drawings wherein like reference numerals identify similar structural features or aspects of the subject disclosure. For purposes of explanation and illustration, and not limitation, an illustrative view of an embodiment of a rotary adjustable plate orifice valve in accordance with the disclosure is shown in FIG. 1 and is designated generally by reference character 100. Other embodiments and/or aspects of this disclosure are shown in FIGS. 2-6. The systems and methods described herein can be used to regulate pressure between a first flow path (indicated by pressure "P1") and a second flow path (indicated by pressure "P2").

Generally, in certain embodiments, a valve with a rotationally adjustable flow area can include a first member defining a first wall having a first opening therein, and a second member defining a second wall having a second opening therein, the first member being rotatable relative to the second member, and flow area through the valve being defined by fluidic communication between the first opening and the second opening that varies with relative rotational position between the first member and the second member.

Figure 2A:
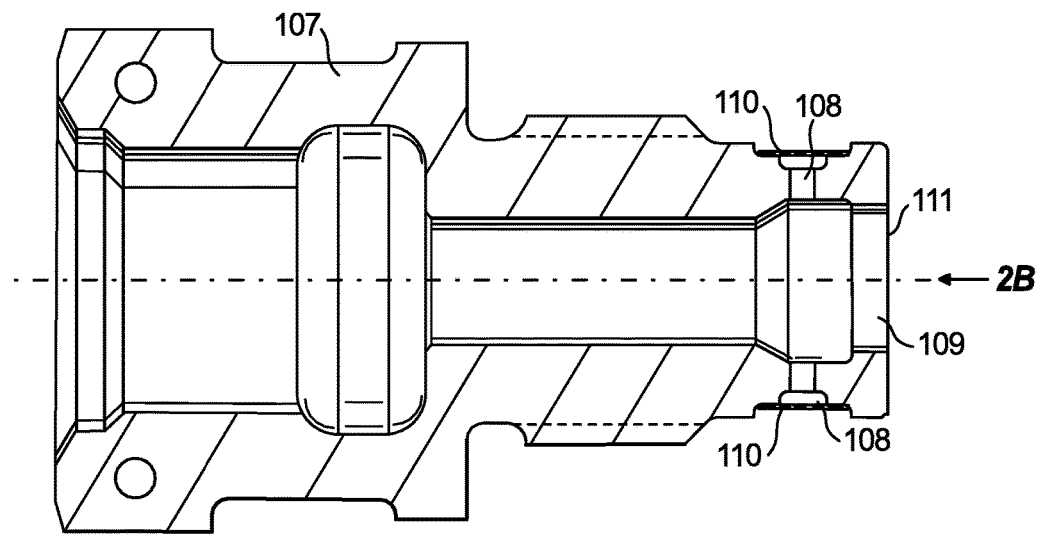
FIG. 2A is a cross-sectional side view of an embodiment of a sleeve in accordance with this disclosure.
Figure 2B:
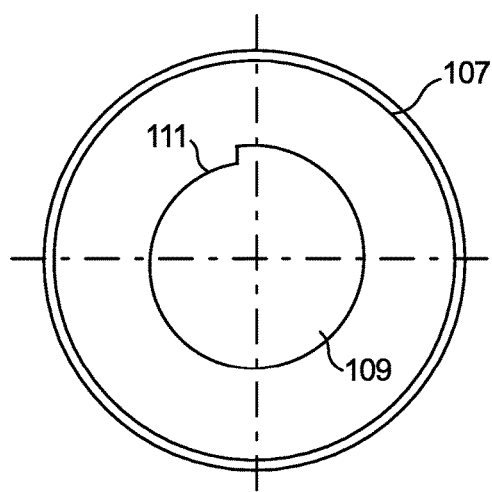
FIG. 2B is a front plan view of the sleeve of FIG. 2A, showing the cam surface in accordance with this disclosure.

Referring to FIG. 1, embodiments of such a valve can include a rotary adjustable plate orifice valve 100, for example. The valve 100 can include a housing 101 including a first fluid path opening 105 and a second fluid path opening 103. Referring additionally to FIGS. 2A and 2B, a sleeve 107 is disposed at least partially within the housing 101. The sleeve 107 includes a sleeve opening 109 defined by a cam surface 111. In certain embodiments, the sleeve 107 can threadably engage with the housing 101 as shown.

The sleeve 107 can further include radial openings 108 for receiving P1 pressure from the first fluid path 105. A filter 110 (e.g., a last chance screen) can be disposed over the radial openings 108.

As shown in FIG. 2B, the cam surface 111 can define a spiral shape. Any other suitable shape is contemplated herein.

Figure 3A:
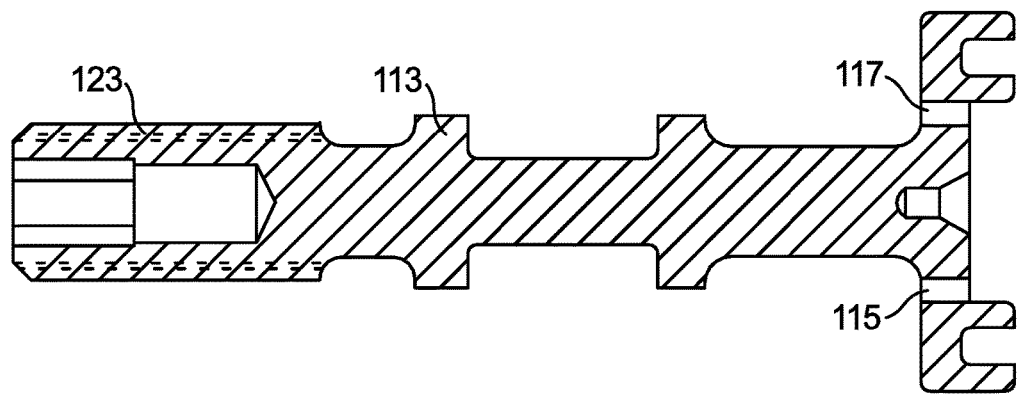
FIG. 3A is a cross-sectional side view of an embodiment of a spool in accordance with this disclosure.
Figure 3B:
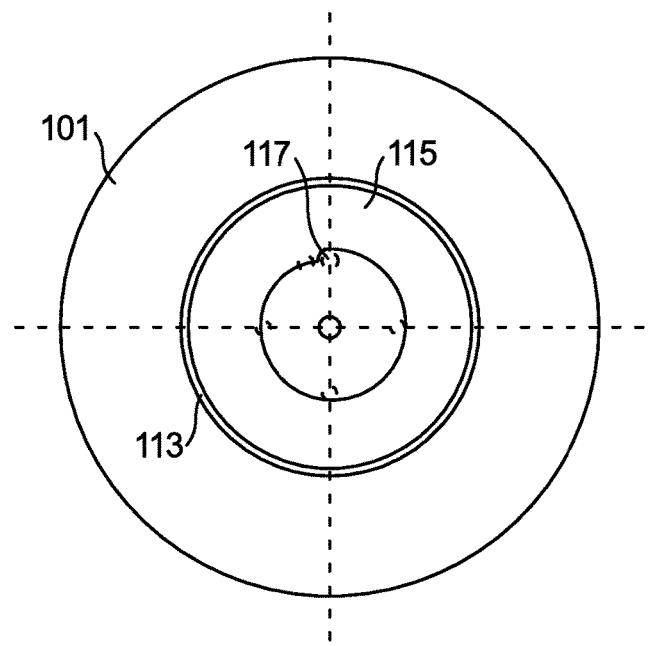
FIG. 3B is a front plan view of the spool of FIG. 3A, showing a cam line overlaid on the spool for reference.

Referring additionally to FIGS. 3A and 3B, the valve 100 includes a spool 113 disposed at least partially within the sleeve 107 and the housing 101. The spool 113 is configured to rotate relative to the sleeve 107 and to housing 101. The spool 113 includes a plate face 115 that abuts the cam surface 111. A plate orifice 117 is defined through the plate face 115 and can be positionable to vary between being in full unoccluded fluidic communication with the opening 109, being fully occluded from any fluidic communication with the opening 109 as well as being partially fluidic communication with the opening 109, depending upon a rotational orientation between the spool 113 and the sleeve 107. The plate orifice 117 can be circular in cross-sectional shape. Any other suitable shape is contemplated herein (e.g., oval, square) as long as rotational interaction of sleeve 107 and the cam surface 111 causes changes in total open flow area available for flow through the plate orifice 117.

As shown in FIG. 3B, the plate orifice 117 is positioned at a 0 degree position, however, phantom positions are shown overlaid on an illustrative cam profile of the cam surface 111. In certain embodiments, the plate orifice 117 can be sized such that at no point of rotation is flow area smaller than a size that would cause clogging of the orifice 117 (e.g., no smaller than the smallest filter size in a fuel system). In certain embodiments, the orifice 117 can be sized to meet about 53 pph minimum of fuel flow at about 60 psid at about 32 F.

The cam surface 111 can be shaped to allow adjustment of fuel flow down to 53 pph under all tolerance conditions, for example. In certain embodiments, the cam surface 111 may not close the orifice 117 past half open area.

The spool 113 can include a face seal 119 disposed in the plate face 115 and in sealing communication with the housing 101. In certain embodiments, a ring seal 121 can be disposed around an outer diameter of the sleeve 107 and in sealing communication with the housing 101.

The spool 113 can include a threaded end 123 opposite the plate face 115. A lock nut 125 can be in threaded connection with the threaded end 123 of the spool 113. The lock nut 125 can tighten the plate face 115 of the spool 113 against the cam surface 111 of the sleeve 107.

In certain embodiments, the spool 113 can include a ring seal 127 disposed in sealing communication with an inner diameter of the sleeve 107. This ring seal 127 can prevent P1 from leaking to atmospheric pressure (e.g., during testing). In certain embodiments, the valve 100 can include a cap 129 configured to connect to the sleeve 107 at an opposite end relative to the cam surface 111 to cover the threaded end 123 of the spool 113 and the lock nut 125 disposed on the threaded end 123.

Figure 4:
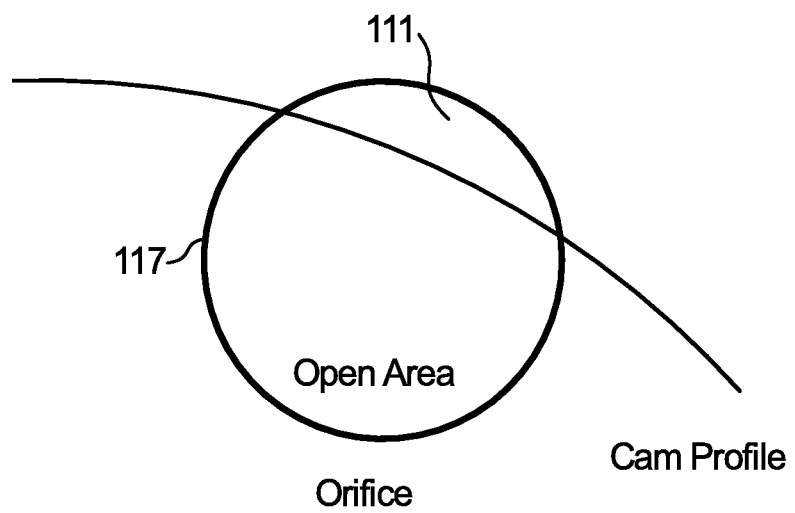
FIG. 4 is a schematic diagram indicating an open area of the plate orifice in a partially obstructed position by the cam surface.

Referring additionally to FIG. 4, an amount of open area of the orifice 117 that is in fluid communication with the sleeve opening 109 changes as a function of a rotational position of the orifice 117 relative to the cam surface 111. Fluid can flow between the first fluid path P1 and the second fluid path P2 through the plate orifice 117.

Figure 5:
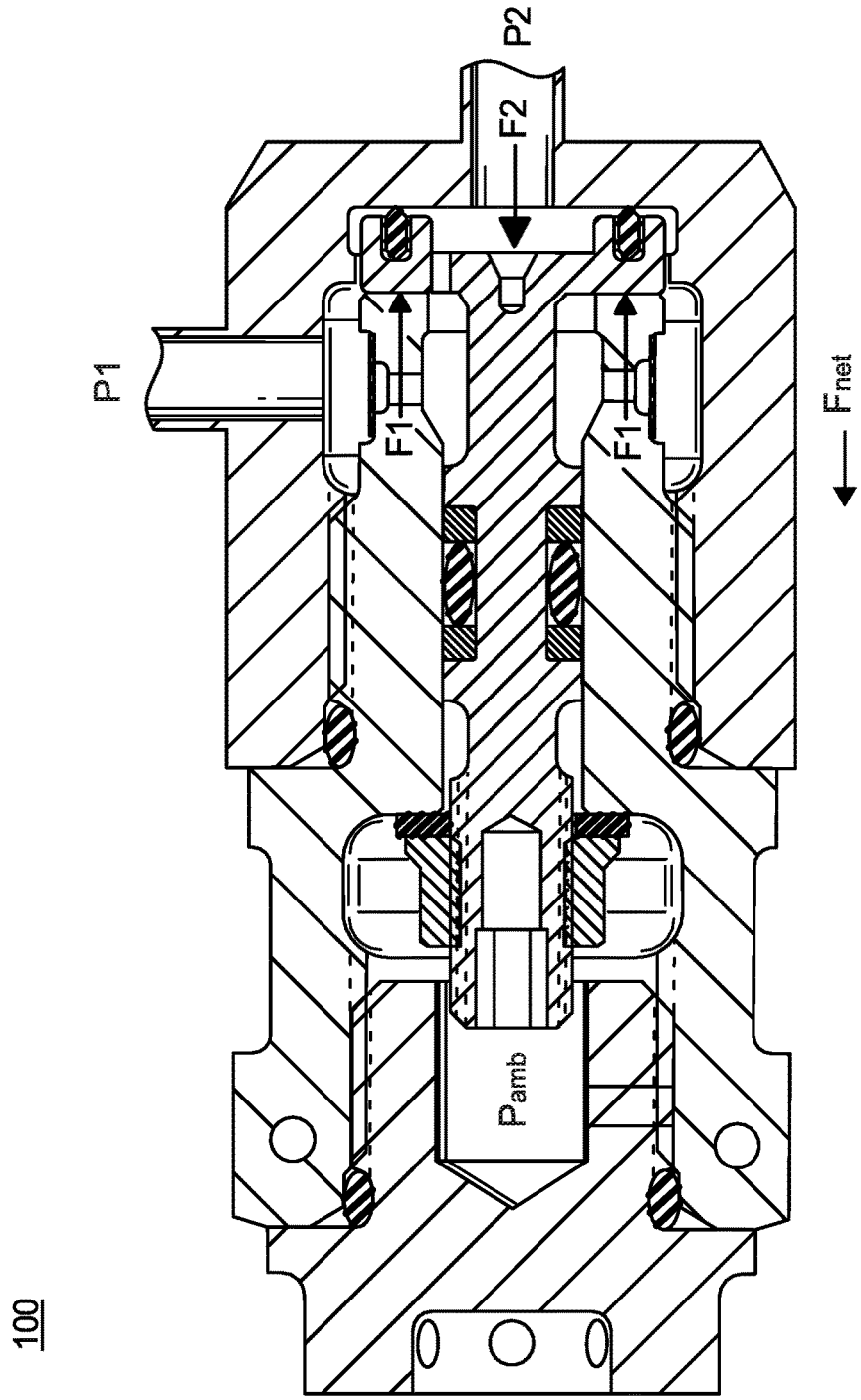
FIG. 5 is a cross-sectional view of an embodiment of a rotary adjustable plate orifice valve in accordance with this disclosure show having pressure applied through P1 and P2, with a net force leading into P1.

Referring to FIG. 5, the valve 100 is shown having a pressure P2, P1, and Pambient applied to the valve. As shown, the net force facilitates a sealing force between the rotating plate 115 and sleeve 107.

Figure 6:
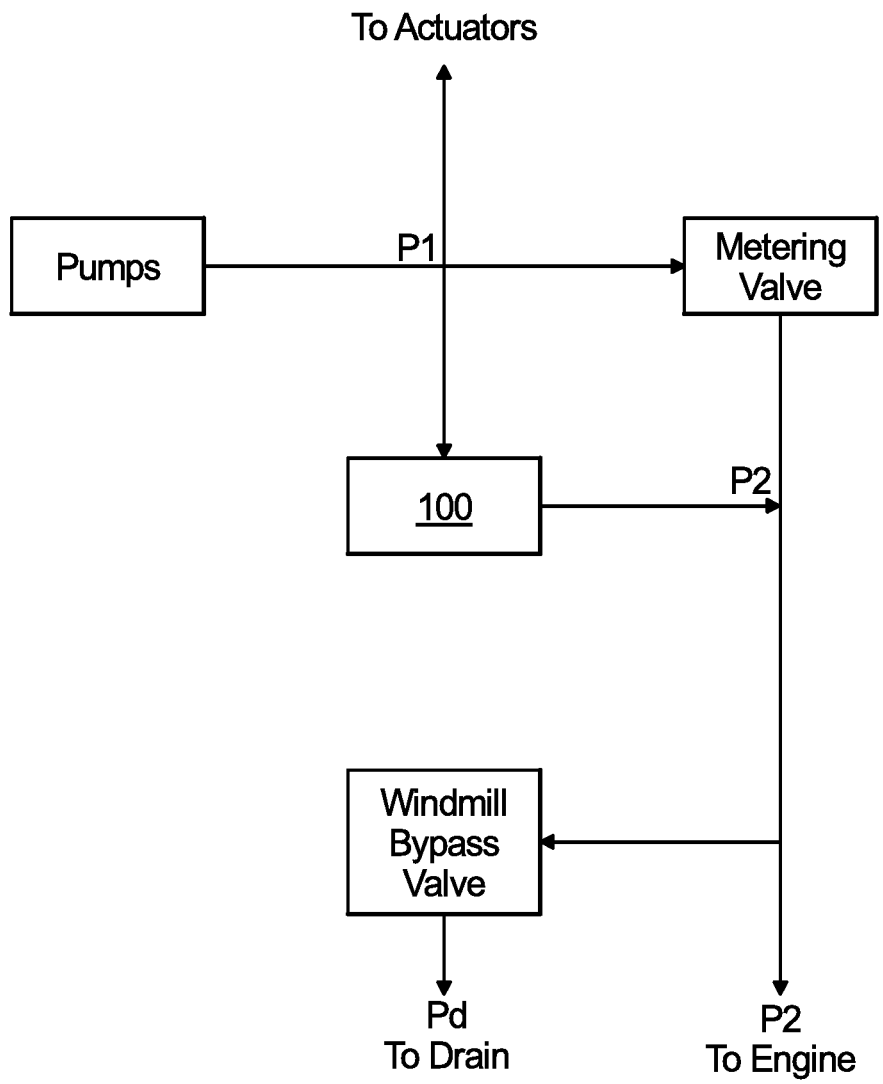
FIG. 6 shows a partial systematic view of a fuel system, showing an embodiment of a rotary adjustable plate orifice valve disposed therein.

Referring to FIG. 6, an embodiment of a valve 100 is shown disposed in a fuel system 600. P1 branches can be filtered or unfiltered. In certain embodiments, flow from the first fluid path can be filtered flow according to filtration hierarchy for fuel control.

While embodiments above describe the cam surface 111 as being on the sleeve 107, in certain embodiments, the cam surface 111 can be located on the spool 113 and the orifice 117 can be defined in the sleeve 107. Any other suitable rotational dependent valve scheme is contemplated herein.

In accordance with at least one aspect of this disclosure, a method can include rotating a spool of a valve such that a plate orifice defined in a plate face thereof is positioned relative to a cam surface of a sleeve at a predetermined rotational position to block a predetermined amount of flow area of the plate orifice. In certain embodiments, the method can include locking the spool in place after positioning the spool and the plate orifice in the predetermined rotational position. Locking the spool can include tightening a lock nut threadably engaged with a threaded end of the spool against an inner surface of the sleeve to compress the plate face of the spool against the cam surface.

Embodiments include an adjustable orifice positioned between P1 and P2 to guarantee a minimum flow level into the P2 circuit to generate suitable actuator pressure from the WBV. Embodiments include an orifice defined in a rotating plate face of spool that rotates over a shaped window (e.g., the opening 109 defined by the cam surface 111) to open up or decrease the open area of the orifice. The spool and sleeve can be pre-loaded together by a locking screw, which reduces the clearance of the leak path into the orifice, e.g., to improve accuracy as temperature changes. The spool can be locked in place once the orifice opening is adjusted to achieve a precise range of flow.

Embodiments include benefits such as the ability to meet filtration hierarchy, reduced leakage around minimum flow orifice, reduced sensitivity to rotation (increased ease of adjustability), reduced effect of edge breaks on flow accuracy, and smaller physical package size. Embodiments provide a robust, easy to adjust orifice.

The methods and systems of the present disclosure, as described above and shown in the drawings, provide for valve systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A rotary adjustable plate orifice valve, comprising:
a housing including a first fluid path opening and a second fluid path opening;
a sleeve disposed at least partially within the housing and having a sleeve opening defined by a cam surface; and
a spool disposed at least partially within the sleeve and the housing and configured to rotate relative to the sleeve, the spool including:
a plate face that abuts the cam surface; and
a plate orifice defined in the plate face and configured to be positioned to be partially in fluid communication with the sleeve opening and to be partially blocked by the cam surface, wherein an amount of open area of the plate orifice that is in fluid communication with the sleeve opening changes as a function of a rotational position of the orifice relative to the cam surface;
wherein fluid can flow between the first fluid path and the second fluid path through the plate orifice, wherein the spool extends through the sleeve opening to contact the cam surface.

2. The valve of claim 1, wherein the sleeve further includes radial openings for receiving pressure from the second fluid path at the sleeve opening.

3. The valve of claim 2, wherein a filter is disposed over the radial openings.

4. The valve of claim 1, wherein the cam surface defines a spiral shape.

5. The valve of claim 1, wherein the plate orifice is circular in cross-sectional shape.

6. The valve of claim 1, wherein the spool includes a face seal in sealing communication with the housing.

7. The valve of claim 1, further comprising a ring seal disposed around an outer diameter of the sleeve in sealing communication with the housing.

8. The valve of claim 1, wherein the spool includes a threaded end opposite the plate face.

9. The valve of claim 8, further comprising a lock nut in threaded connection with the threaded end of the spool and configured to tighten the plate face of the spool against the cam surface of the sleeve.

10. The valve of claim 9, wherein the spool includes a ring seal disposed in sealing communication with an inner diameter of the sleeve.

11. The valve of claim 9, further comprising a cap configured to connect to the sleeve at an opposite end relative to the cam surface to cover the threaded end of the spool and the lock nut disposed on the threaded end.

12. The valve of claim 1, wherein flow from the first fluid path is filtered flow according to a filtration hierarchy for fuel control.

13. A method, comprising:
rotating a spool of a valve such that a plate orifice defined in a plate face thereof is positioned relative to a cam surface of a sleeve at a predetermined rotational position to block a predetermined amount of flow area of the plate orifice, the cam surface defines a sleeve opening, wherein the spool extends through the sleeve opening to contact the cam surface.

14. The method of claim 13, further comprising locking the spool in place after position the spool and the plate orifice in the predetermined rotational position.

15. The method of claim 13, wherein locking the spool includes tightening a lock nut threadably engaged with a threaded end of the spool against an inner surface of the sleeve to compress the plate face of the spool against the cam surface.

16. A valve with a rotationally adjustable flow area, comprising:
a first member defining a first wall having a first opening therein; and
a second member defining a second wall having a second opening therein, the first member being rotatable relative to the second member, and flow area through the valve being defined by fluidic communication between the first opening and the second opening that varies with relative rotational position between the first member and the second member, wherein the first member extends through the second opening to contact the first and second walls together.

17. The valve of claim 16, further comprising a housing including a first fluid path opening and a second fluid path opening, wherein the first member includes a sleeve disposed at least partially within the housing, wherein the first wall includes a cam surface, wherein the first opening is a sleeve opening defined by the cam surface, and wherein the second member includes a spool disposed at least partially within the sleeve and the housing and configured to rotate relative to the sleeve, wherein the second wall is a plate face of the spool that abuts the cam surface, and wherein the second opening includes a plate orifice defined in the plate face and positioned to be partially in fluid communication with the opening and to be partially blocked by the cam surface, wherein an amount of open area of the orifice that is in fluid communication with the sleeve opening changes as a function of a rotational position of the orifice relative to the cam surface.

* * * * *